United States Patent
Belart

[15] 3,638,426
[45] Feb. 1, 1972

[54] POWER ASSISTED BRAKE

[72] Inventor: Juan Belart, Walldorf, Germany

[73] Assignee: International Telephone and Telegraph Corporation, New York, N.Y.

[22] Filed: Feb. 13, 1970

[21] Appl. No.: 11,045

[30] Foreign Application Priority Data

Feb. 25, 1969 Germany ............... P 19 09 399.3

[52] U.S. Cl. ........................................ 60/54.6 P, 60/52 B
[51] Int. Cl. ................................................. F15b 7/00
[58] Field of Search ............... 60/52 B, 54.5, 6 P; 91/431, 91/376

[56] References Cited

UNITED STATES PATENTS

| 2,957,311 | 10/1960 | Stelzer | 60/54.6 P |
| 2,992,533 | 7/1961 | Hodkinson | 60/52 B |
| 3,148,592 | 9/1964 | Schultz et al. | 60/54.6 P |

Primary Examiner—Edgar W. Geoghegan
Assistant Examiner—A. M. Zupcic
Attorney—C. Cornell Remsen, Jr., Walter J. Baum and Paul W. Hemminger

[57] ABSTRACT

A power assisted brake of the type in which a booster pump supplies brake fluid to a booster chamber between the master cylinder piston and the actuator to supplement the brake pedal effort including an easily removable booster valve subassembly comprising a movable part which is slidable in a control sleeve to provide throttling of the flow from the booster chamber to the system reservoir.

3 Claims, 1 Drawing Figure

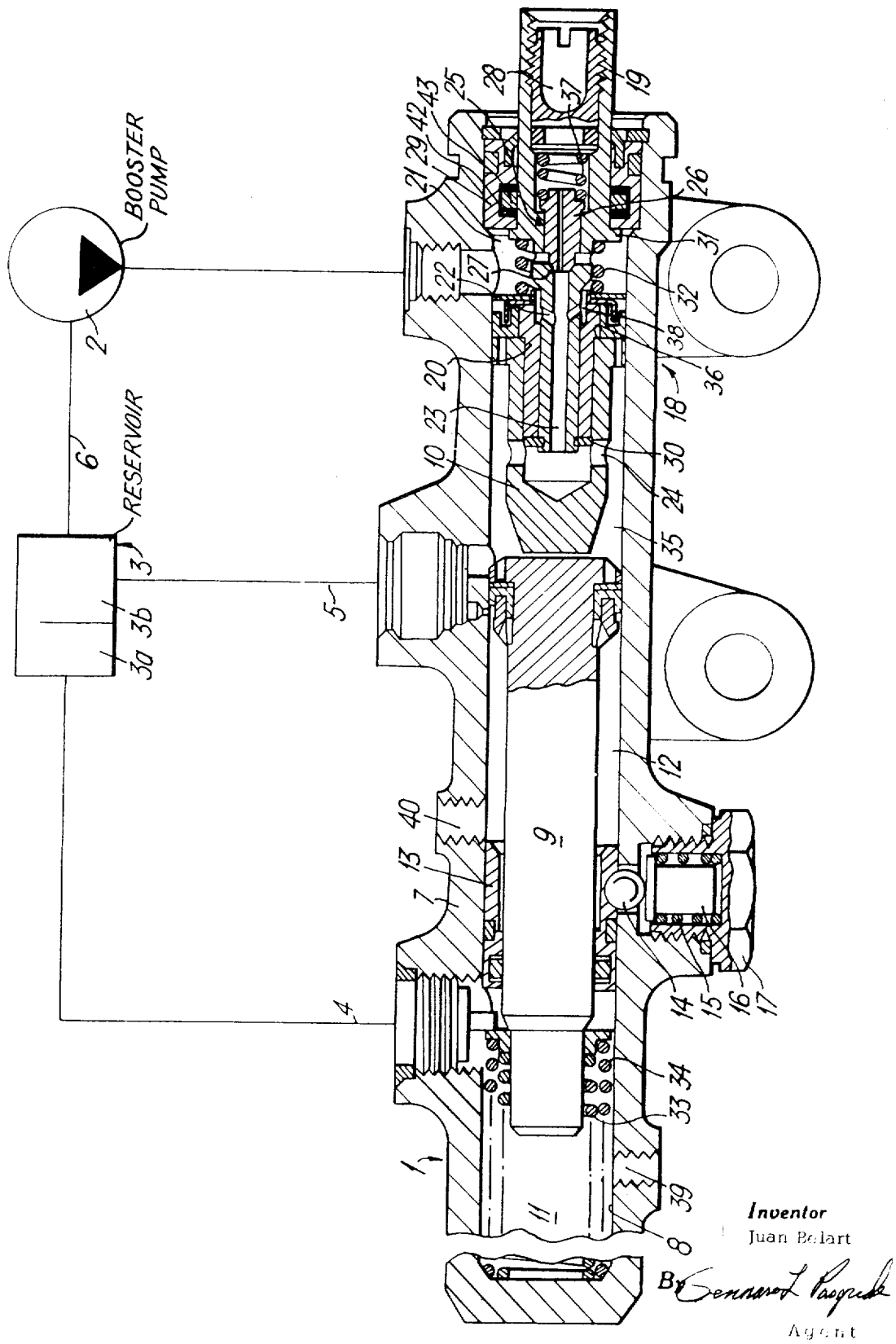

POWER ASSISTED BRAKE

BACKGROUND OF THE INVENTION

1. Field of the Invention

The invention relates to a booster for hydraulic brake systems and particularly to brake systems in which a booster pump conveys hydraulic fluid to a pressure chamber behind the master cylinder actuating piston, the pressure in the chamber being controlled by a normally open slide valve assembly which throttles the flow from the pressure chamber into a reservoir when the brakes are actuated to increase the pressure acting on the piston.

2. Description of Prior Art

German Pat. Nos. 1,107,099 and 1,226,444 disclose hydraulic brake system boosters of this type in which the valve part which is relatively stationary is attached to, and positioned by, the master cylinder piston and the valve part which is movable with respect to the stationary valve part is guided and sealed in a bore of the master cylinder housing. A disadvantage of this type system is that the guide bores for the movable valve part and the master cylinder piston as well as the piston and stationary valve part have to be manufactured with the greatest accuracy to provide proper alignment of the valve parts. Normally the master cylinder piston and bore need not be manufactured with great precision.

Another disadvantage of this type of booster is that the movable valve part and the piston with the stationary valve part attached have to be individually matched and fitted to the master cylinder. This requires a single production and assembly line for all parts of the master cylinder even though most of the master cylinder parts may be manufactured with much less precision than the booster valve parts.

German Pat. No. 1,232,827 discloses a brake booster which is completely separate from the master cylinder. The output of a booster pump is fed to a chamber hydraulically connected to the master cylinder. The pressure in the chamber is controlled by a normally open valve connecting the chamber to the reservoir. A push rod carrying the movable valve part first closes the valve to increase the pressure in the chamber and then lifts the valve seat as the push rod continues to move thereby connecting a pressure accumulator to the chamber.

Although this construction allows the master cylinder to be manufactured and assembled separately from the booster, it is not practical for automotive use because of the excessive cost and space requirements for the two assemblies.

SUMMARY OF THE INVENTION

An object of the present invention is to provide a master cylinder booster throttle valve which can be inserted in the master cylinder as a unit without precision machining of the master cylinder.

Another object of this invention is to provide single master cylinder booster throttle valve assembly which may be easily used in master cylinders of different size.

This invention achieves these objects by a throttle valve assembly in which the movable and stationary parts of the valve are guided on each other so that they may be precisely manufactured, assembled and then inserted in a master cylinder which is not machined with great precision. The movable and stationary parts of the valve have abutments limiting their relative movability with respect to each other. Preferably the movable part has a cylindrical extension on which a control sleeve, which forms the stationary part, is guided and supported. In valves of this type both parts are movable with the respect to the master cylinder housing, and therefore where the term movable part of the valve is used herein it should be understood to mean that part which is moved by the actuating push rod. Similarly the term stationary part means that part which follows the movement of the piston.

The length of the booster can be reduced by providing a longitudinal bore in the movable part serving to lead the hydraulic fluid from the throttle to the master cylinder reservoir. Moreover, it is advantageous to place a pressure relief valve in the longitudinal bore of the movable part. In order to reduce the number of component parts to a minimum, the plug for the longitudinal bore in the movable part also serves as tappet base for the support of the actuating push rod. For guiding the booster control assembly, consisting of the movable part and the stationary part, an axial bore is provided in the master cylinder booster piston in which the sleeve of the control assembly is fitted. An annular element is inserted in the master cylinder for holding the movable part, the movable part being sealed from the inserted element by a sealing ring positioned between supporting rings of elastic material with high rigidity.

The accompanying drawing shows a longitudinal cross section through a master cylinder with a control device according to the invention.

DESCRIPTION OF THE PREFERRED EMBODIMENT

The drawing shows a master cylinder indicated by reference numeral 1, a booster pump 2, and a reservoir 3. The reservoir 3 comprises two chambers 3a and 3b and is connected through the lines 4 and 5 with the two operating circuits 39 and 40 of the master cylinder 1 and through line 6 with the booster pump 2, thus constituting the common reservoir for all parts of the system. The housing 7 of the master cylinder provides a longitudinal bore 8 in which are arranged the actuating piston 9, the booster piston 10 and a sleeve or bushing 13 dividing the front part of the longitudinal bore 8 into two chambers 11 and 12. The sleeve 13 is kept in its position by a spring-loaded ball 14 which passes through the cylinder bore and engages in an associated recess in the sleeve 13. The recess in the sleeve 13 is made in such a way that an axial movement of the sleeve in the longitudinal bore 8 of the master cylinder 1 requires a displacement of the ball 14 out of the longitudinal bore against the force of a spring 15. The lift of the ball 14 is limited by a thrust piece 16 which overcomes a predetermined clearance and then bears against the locking screw 17. The arrangement allows the sleeve 13 to be displaced a limited amount in response to a pressure differential to equalize the pressure. If, however, one of the two circuits becomes defective, the function of the second circuit is not impaired and the actuating stroke is increased by only a small amount.

For the control of the booster a control device 18 is provided, comprising a relatively stationary control sleeve 20 and a cylindrical valve plug or movable part 19 slidable within the control sleeve 20. The movable part 19 and the control sleeve 20 serve together as throttle 38 with a variable cross-sectional area. This throttle controls the flow of hydraulic fluid from the booster pump 2 through a pressure chamber 21 behind the booster piston 10 and into the reservoir 3. The hydraulic fluid flows to the reservoir from the chamber 21 via throttle passage 38, hole 22, longitudinal bore 23 in the movable part 19, holes 24 in the booster piston 10, and chamber 35 behind the actuating piston 9.

On the side remote from the booster piston 10 the longitudinal bore 23 is closed towards the pressure chamber 21 by the valve closing member 26 of the relief valve 25 arranged in the movable part 19.

The valve closing member 26 of the pressure relief valve 25 is held against its seat 27 by spring 37. This spring bears against the plug 28 screwed into the open rear end of the movable part 19 which provides a thread. The plug 28 has a spherical seat which engages the spherical end of an actuating rod (not shown). The booster control assembly 18 with the movable part 19 and the control sleeve 20 constitute a compact component assembly which can be pulled out of the bore in the master cylinder housing 7 without special tools which the annular member 29, which serves to support the movable part 19, has been removed. A snap spring 30 is arranged at one end of the movable part 19. This ring prevents the control sleeve 20 from sliding off the movable part 19. A sealing ring 43 fits in an annular groove of the member 29 between supporting rings 42 to seal the movable part 19 from the annular member 29. The control assembly 18 is prevented from sliding out of the master cylinder bore 8 by an annular flange 31 on the movable part 19 bearing against the annular member 29. A shoulder 36 on the outside of the control sleeve 20 forms an abutment for the booster piston 10 and the booster piston 10 in turn serves as abutment for the master cylinder piston 9.

The forces exerted by springs 32, 33 and 34 are such that the throttle is open when the brakes are not applied so that no pressure is built up in the chamber 21.

When the brakes are first applied, the movable part 19 and the whole control assembly 18 together with the actuating piston 9 are pushed into the longitudinal bore 8 of the master cylinder housing 7 against the force of the springs 33 and 34, the throttle 38 remaining open, and the pressure from the working chambers 11 and 12 is led through the bores 39 and 40 in the master cylinder housing 7 to the wheel cylinders. When the pressure in the chambers 11 and 12 rises to such an extent that it exceeds the counteracting force of the spring 32, the movable part 19 of the valves slides forward within the sleeve 20 until the throttle passage 38 is closed, thereby allowing the pressure in chamber 21 to increase.

As the pressure in chamber 21 rises, it acts upon the annular surface of the booster piston 10 and thus transmits the force of the booster to the actuating piston 9. The pressure in chamber 21 also acts in the opposite direction tending to force the movable part 19 out of the master cylinder 1. When in this way the input force of the actuating rod (not represented) is reduced, the throttle passage 38 is again opened and the full output of the booster pump 2 again flows to the reservoir.

When an extremely high-input force is transmitted, the pressure in the pressure chamber 21 rises to such an extent that the relief valve 25 opens and clears the circulation to the reservoir 3. The direct braking effect which is transmitted to the piston 9 via the movable part 19, sleeve 20 and booster piston 10 is not affected by the release of the booster pressure.

The compact control assembly 18 can also be applied to tandem master cylinders. Due to this arrangement, the external dimension measurements of the cylinder housing can substantially be reduced and assembling becomes easier.

It will be appreciated that the invention illustrated and described herein may be modified by those skilled in the art without deviating from the spirit and scope of the invention as set forth in the following claims.

I claim as my invention:

1. In a power assisted hydraulic brake system having a hydraulic fluid reservoir, a booster pump coupled to said reservoir, a master cylinder coupled to said pump to receive hydraulic fluid therefrom and said reservoir to discharge hydraulic fluid thereto, and at least one brake circuit coupled to said master cylinder, said master cylinder comprising:

a hollow cylindrical housing having a longitudinal axis;

a master cylinder actuating piston disposed coaxially of said longitudinal axis and sealed to and slidably engaging the inner surface of said housing;

a hollow booster piston disposed coaxially of said longitudinal axis having one end thereof adjacent one end of said actuating piston closed to provide an actuating surface for said actuating piston, said booster piston having a first portion spaced from the inner surface of said housing, an annular portion adjacent the end thereof opposite said one end sealed to and slidably engaging the inner surface of said housing and at least one passageway disposed adjacent said one end extending substantially radially through the wall of said booster piston;

a hollow cylindrical control sleeve disposed coaxially of said longitudinal axis having a first portion slidably engaging the inner surface of aid booster piston extending to a point adjacent said one passageway of said booster piston and an annular portion adjacent said opposite end of said booster piston sealed to and slidably engaging the inner surface of said housing;

a movable part disposed coaxially of said longitudinal axis having a first portion slidably engaging the inner surface of said control sleeve and a second portion extending from said first portion of said movable part sealed to and slidably engaging the inner surface of said housing, said first portion having a length extending from a first point adjacent said one passageway of said booster piston to a second point beyond said annular portion of said control sleeve and a bore disposed therein coaxial of said longitudinal axis and in communication with said one passageway of said booster piston;

a member disposed coaxially of said longitudinal axis and within said second portion of said movable part to close said bore adjacent said second point;

said one end of said actuating piston, said first and annular portion of said booster piston and the inner surface of said housing forming a first pressure chamber in communication with said one passageway of said booster piston and said reservoir to discharge hydraulic fluid to said reservoir;

said annular portion of said booster piston, said first and second portion of said movable part and said housing forming a second pressure chamber in communication with said pump to receive hydraulic fluid from said pump;

a throttle passage disposed between said control sleeve and said movable part in communication with said first chamber and said bore;

said control sleeve and said movable part being slidable on each other between a first position in which said throttle passage is open and a second position in which said throttle passage is closed, said control sleeve and said movable part abut one another, said one end of said booster piston abuts said one end of said actuating piston to actuate said brake circuit and pressure builds up in said second pressure chamber to assist in actuating said brake circuits; and a spring disposed between said annular portion of said control sleeve and said second portion of said movable part to bias said control sleeve and said movable part toward said first portion;

said second portion of said movable member being responsive to a brake actuating motion to move said control sleeve and said movable part to said second position.

2. A master cylinder according to claim 1, wherein said member includes a pressure relief valve.

3. A master cylinder according to claim 2, further including at least one substantially radial passage disposed in said first portion of said movable part adjacent said second point in communication with said second pressure chamber but normally blocked from communication with said bore by said pressure relief valve;

said pressure relief valve responding to pressure in said second pressure chamber exceeding a predetermined value to connect said substantially radial passage to said bore.

* * * * *